C. A. HOLLAND.
CARRYALL TRAILER VEHICLE.
APPLICATION FILED JAN. 23, 1917. RENEWED DEC. 3, 1918.

1,315,498.

Patented Sept. 9, 1919.
2 SHEETS—SHEET 1.

Inventor
Charles A. Holland

Attys.

C. A. HOLLAND.
CARRYALL TRAILER VEHICLE.
APPLICATION FILED JAN. 23, 1917. RENEWED DEC. 3, 1918.

1,315,498.

Patented Sept. 9, 1919.
2 SHEETS—SHEET 2.

Charles A. Holland, Inventor

Attys.

UNITED STATES PATENT OFFICE.

CHARLES A. HOLLAND, OF NEW YORK, N. Y., ASSIGNOR, BY MESNE ASSIGNMENTS, TO TRACK-BACK TRAILER COMPANY, A CORPORATION OF DELAWARE.

CARRYALL TRAILER-VEHICLE.

1,315,498.     Specification of Letters Patent.     Patented Sept. 9, 1919.

Application filed January 23, 1917, Serial No. 143,953. Renewed December 3, 1918. Serial No. 265,171.

*To all whom it may concern:*

Be it known that I, CHARLES A. HOLLAND, a citizen of the United States, and resident of the State of New York, city of New York, county of New York, have invented certain new and useful Improvements in Carryall Trailer-Vehicles, of which the following is a specification.

My present invention relates to a trailer vehicle designed to be attached to and drawn by any ordinary vehicle.

Among the objects of the invention are:

First, to provide for touring automobiles, which are very limited in carrying capacity other than the passengers, means for transporting supplies of all kinds for campers, tourists, fishing, and hunting parties, surveyors and the like;

Second, to provide a trailer which may be used to transport and deliver merchandise;

Third, to provide a trailer which may be easily and quickly attached to and detached from the automobile, or the like, which, when trailing behind the same, will not interfere with its being backed or manipulated in the usual manner, and which, when not in use as a trailer, will be held stationary in convenient and accessible position.

With these and other objects in view the invention includes the novel features of construction and arrangement and combination of parts hereinafter described and particularly defined by the appended claims.

An embodiment of my invention is illustrated in the accompanying drawings, in which, Figure 1 is a top plan view of a trailer vehicle.

Figure 1:
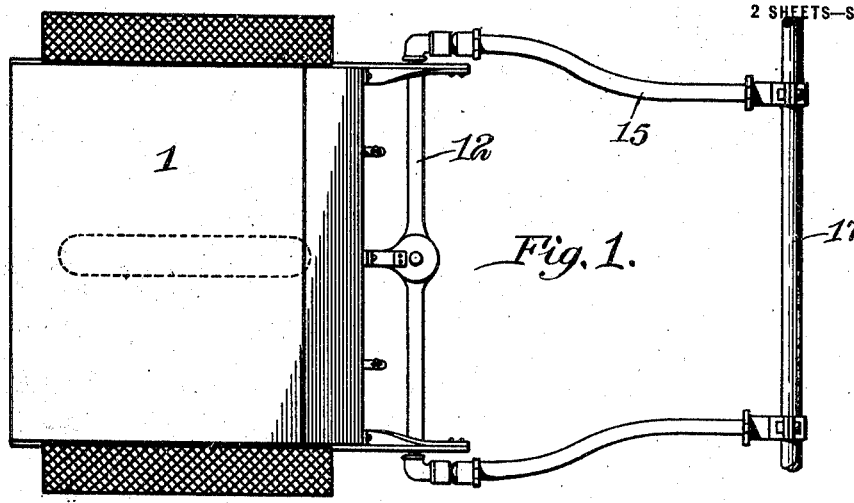

Referring more particularly to these drawings, the numeral 1 designates the body of the trailer, which I prefer to construct of sheet metal substantially of box form, as shown. This body portion is provided with a central longitudinal space 2, within which is located the single supporting wheel 3, which is journaled upon an axle 6, extended through the inner walls $1^a$ and outer side walls $1^b$ of the body. The said walls are preferably provided with reinforcing plates 7, $7^a$, $7^b$ and $7^c$, where the axle passes through the walls.

In order to reduce vibration, I interpose between said walls and said axle packing sleeves, or washers, as indicated at 8, of elastic material, such as rubber, said sleeves being confined between the plates 7 and $7^a$, etc., which latter are provided with recesses, or rabbets, to receive the sleeves or blocks.

Figure 9:
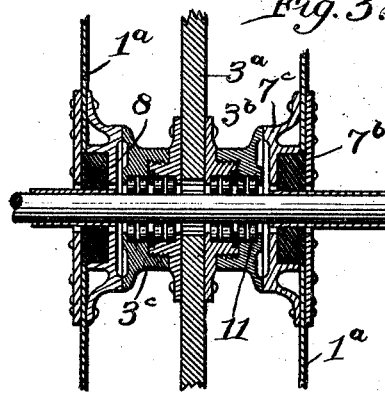
Fig. 9 is a sectional detail of the axle on a larger scale.
Figure 10:
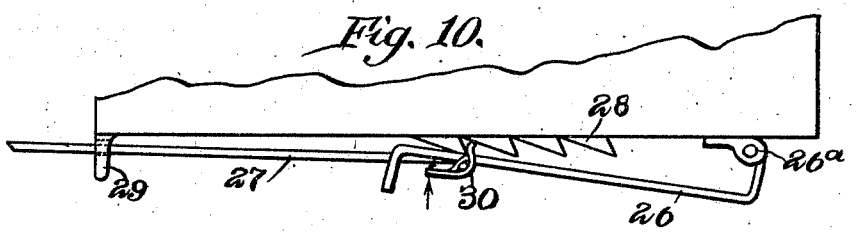
Fig. 10 is a detail view showing a convenient manner of bracing the legs.

The axle is formed of a solid rod extending transversely completely through the body, and it is confined in position by end cap nuts 9 screwed on the threaded ends of the axle, as shown in Fig. 9. The portion of the axle on each side of the wheel bearing is encircled by a sleeve 10, which has its ends lying between the rubber blocks and the axle.

The wheel spokes $3^a$ are connected by hub members $3^b$ upon the threaded ends of which are screwed the hub members $3^c$ which confine the roller bearings 11 removably in place, and these hub members $3^c$ abut against and rotate between the inner members $7^a$.

In order that the trailer vehicle may not interfere with the proper motions of the motor vehicle in backing and the like, and move with it in the most effective manner, I adapt it for connection through the interposition of a whiffle-tree. This conveniently consists of a bar 12 having a flattened central portion pivotally connected to the center of the vehicle body and having its opposite ends slidably guided in slots $13^a$ in the extended ends of side bars, or plates 7, which serve to prevent rocking strains on the whiffle-tree. The extremities of the whiffle-tree are provided with draft bars 15, which are provided at their forward ends with coupling devices adapted to be attached to the rear end of the motor vehicle.

These coupling devices are designed for attachment to either a rear axle or rear springs, thereby facilitating connection of the trailer to any motor vehicle. To this end each comprises a member 16 connected to the end of the shaft 15 and having a V shaped recess $16^a$ to receive the axle indicated at 17.

Figure 5:
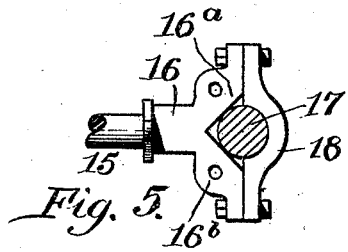
Figs. 5, 6 and 7 are detail views of coupling devices.

A complementary clamp member 18 has a recess to fit the other side of the axle, as shown in Fig. 5, and is clamped to the member 16 by bolts, as shown.

Figure 6:
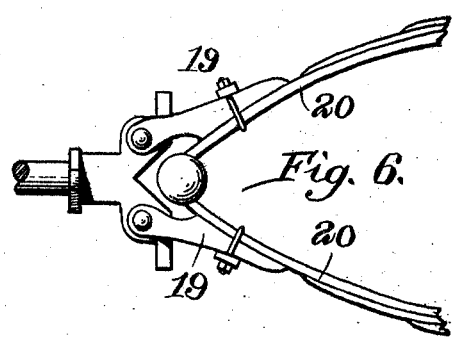

For attaching the member 16 to a rear spring, I provide said member with holes 16$^b$, enabling a pair of coupling members 19 to be clamped to the spring leaves 20 by shackles, as shown in Fig. 6.

Figure 7:
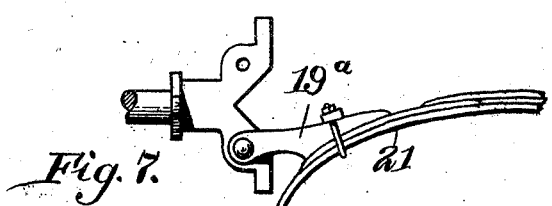
Figure 3:
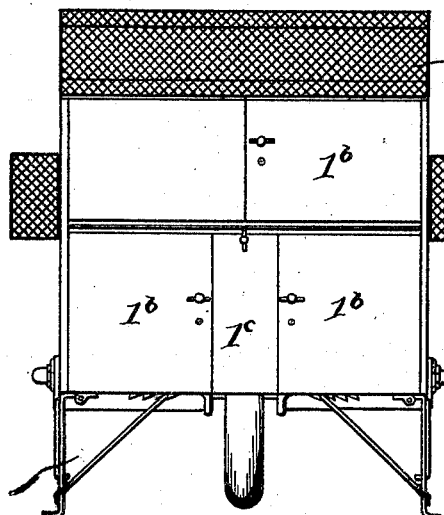
Fig. 3 is a rear view with the vehicle supported upon its legs.
Figure 4:
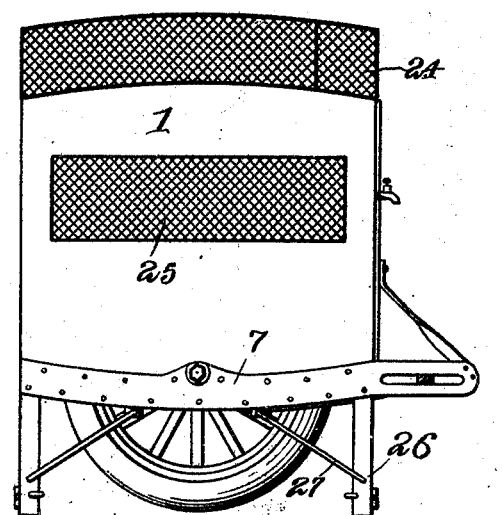
Fig. 4 is a side view.

In case of semi-elliptical springs, as shown at 21, Fig. 7, only one coupling member would be used, as indicated at 19$^a$.

Figure 2:
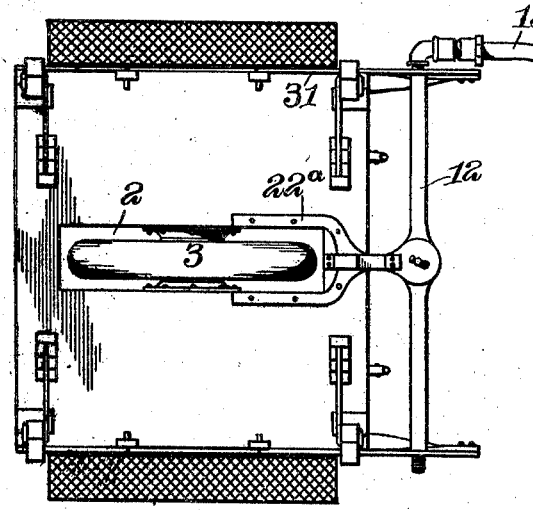
Fig. 2 is a bottom plan view.
Figure 8:
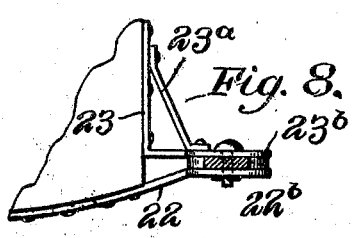
Fig. 8 is a sectional detail of the whiffle-tree.

The whiffle-tree is preferably connected to the body in the manner shown in detail in Fig. 8, from which it will be seen that an iron strap, or bar, 22 is suitably connected to the underside of the body, as by means of rivets, this bar having a forked portion providing members 22$^a$ lying on each side of the wheel space. (See Fig. 2). This bar terminates in a circular or disk shaped portion 22$^b$, upon which the central disk shaped part of the whiffle-tree rests, which latter is surmounted by a similar disk shaped part 23$^b$ of an L shaped bracket 23 riveted, or otherwise secured to the front of the body. Preferably the connection is further strengthened by an inclined brace 23$^a$.

The body of the vehicle is provided at front and rear with storage compartments on each side of the space occupied by the supporting wheel, which may be used for the storage of any desired material and which compartments are closed by doors, indicated at 1$^b$, provided with suitable locks and with a shallow intermediate compartment provided with a door 1$^c$.

Above these compartments at the front of the vehicle I provide a space in which are accurately fitted three cans, or tanks, for the reception of gasolene, lubricating oil, and water, and which are provided with faucets, as shown. These tanks may be conveniently retained in position by extending downwardly at the front the openwork rack 24, which surmounts the body and which may be used to carry luggage, tent material, or any analogous articles.

I also prefer to provide the vehicle at the sides with openwork receptacles 25, as shown, which may be made detachable.

When the trailer vehicle is detached from a motor vehicle it needs supporting means for maintaining it in a horizontal position, owing to its single supporting wheel being centrally arranged. To provide for this, I locate at the corners of the body folding legs 26 hinged to the body at 26$^a$. They are held in unfolded or body supporting position by pivotally connected braces 27 having ends adapted to engage ratchet teeth 28 on the underside of the body, these ends, when the legs are folded, being engaged by eyes or guides 29, and the legs and braces being held up against the body by spring devices 30. Other braces 31, acting at right angles to braces 30, may be provided, if necessary, which may be made detachable.

Having thus fully described my invention, what I claim is:—

1. A trailer vehicle comprising a closed box body having doors affording access to the interior thereof and having a central longitudinal compartment open at the bottom, a single supporting wheel journaled within said compartment and having its lower portion only projecting in the bottom of said compartment, and means for attaching said box body to the rear of the vehicle.

2. A trailer vehicle comprising a box body, a single central supporting wheel therefor, a whiffle-tree pivotally connected to said box body, fixed guides in which the ends of said whiffle-tree are slidably supported, and rigid arms or links carried by the ends of said whiffle-tree for connecting the same to a vehicle.

3. A trailer vehicle comprising a body, a single centrally disposed supporting wheel therefor, a removable axle projecting through the sides of the body, upon which said wheel is journaled, a whiffle-tree connected to said body, shafts connected to the ends of said whiffle-tree, and means for connecting said shafts with a vehicle.

4. A trailer vehicle comprising a body having a central compartment and side storage compartments, a single supporting wheel journaled in said central compartment, a removable axle for said supporting wheel projecting through the side compartments and side walls, an anti-friction bearing between said wheel and said axle, and means for connecting said trailer vehicle to the rear end of a vehicle.

5. A trailer vehicle comprising a body having a central space and side storage compartments, tubular members supported by the walls of said storage compartments, an axle removably held within said tubular members and extending through said central space, a supporting wheel journaled on said axle in said central space, and means for connecting said body to the rear of a vehicle.

6. A trailer vehicle comprising a body having a central space and side storage compartments, tubular members elastically supported by the walls of said storage compartments, an axle removably held within said tubular members and extending through said central space, a supporting wheel journaled on said axle in said central space, and means for connecting said body to the rear of a vehicle.

7. A trailer vehicle comprising a body having a central space and side storage compartments, tubular members extending through the walls of said storage compartments, cushion members between said tubular members and said walls, an axle held by said tubular members, and a single supporting wheel journaled on said axle within said central space.

8. A trailer vehicle comprising a body having sheet metal walls, reinforcing plates carried by said walls, part of said plates having recessed portions, cushion members retained in said recessed portions, a tubular member supported by said cushion members, an axle retained in said tubular member, and a wheel journaled on said axle.

In testimony whereof, I have affixed my signature this 20th day of December, 1916.

CHARLES A. HOLLAND.

Copies of this patent may be obtained for five cents each, by addressing the "Commissioner of Patents, Washington, D. C."